(12) United States Patent
Raftopoulos et al.

(10) Patent No.: US 11,313,291 B2
(45) Date of Patent: Apr. 26, 2022

(54) SECONDARY THROTTLE CONTROL SYSTEMS AND METHODS

(71) Applicant: GM GLOBAL TECHNOLOGY OPERATIONS LLC, Detroit, MI (US)

(72) Inventors: Andrew A. Raftopoulos, Auburn Hills, MI (US); Michael A. Smith, Clarkston, MI (US); Christopher E. Whitney, Commerce, MI (US); Nathan M. Picot, Farmington Hills, MI (US); Craig E. Slepicka, Wixom, MI (US); Robert Gallon, Northville, MI (US); Darrell W. Burleigh, Fenton, MI (US); Vijay A. Ramappan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/983,375

(22) Filed: Aug. 3, 2020

(65) Prior Publication Data
US 2022/0034269 A1 Feb. 3, 2022

(51) Int. Cl.
*F02D 41/00* (2006.01)
*F02M 25/08* (2006.01)
(Continued)

(52) U.S. Cl.
CPC ..... *F02D 41/0007* (2013.01); *F02D 13/0223* (2013.01); *F02D 41/003* (2013.01); *F02M 25/08* (2013.01); *F02B 29/04* (2013.01); *F02D 41/0047* (2013.01); *F02D 41/123* (2013.01); *F02D 2009/0272* (2013.01);
(Continued)

(58) Field of Classification Search
CPC .. F02M 25/08; F02M 25/0836; F02M 25/089; F02M 26/06; F02D 41/0007; F02D 41/003–0045; F02D 41/005; F02D 41/0055; F02D 41/0057; F02D 41/0065; F02D 41/064; F02D 2009/0272;
(Continued)

(56) References Cited

U.S. PATENT DOCUMENTS 6,227,180 B1 * 5/2001 Hoffmann ............... F02B 33/34
                                                           123/564
10,247,142 B1 * 4/2019 Wang ...................... F02M 26/19
(Continued)

FOREIGN PATENT DOCUMENTS

DE 102007040913 A1 * 3/2009 .............. F02B 33/32
DE 102011018863 A1 * 7/2012 ........... F02M 25/089
(Continued)

*Primary Examiner* — John M Zaleskas (57) ABSTRACT

An engine system includes: a first throttle valve; a turbocharger compressor disposed downstream of the first throttle valve; a charge air cooler disposed downstream of the turbocharger compressor; a second throttle valve located downstream of the turbocharger compressor; a purge inlet located downstream of the first throttle valve and configured to introduce fuel vapor from a fuel tank into intake air; and an engine control module configured to: maintain the first throttle valve in a fully open position; and selectively close the first throttle valve relative to the fully open position in response to receipt of a request to at least one of: purge fuel vapor from the fuel tank; and at least one of decrease and prevent icing of the charge air cooler.

20 Claims, 4 Drawing Sheets

(51) Int. Cl.
  *F02D 41/14* (2006.01)
  *F02D 9/02* (2006.01)
  *F02D 13/02* (2006.01)
  *F02M 26/05* (2016.01)
  *F02D 41/12* (2006.01)
  *F02B 29/04* (2006.01)

(52) U.S. Cl.
  CPC .. *F02D 2041/001* (2013.01); *F02D 2041/002* (2013.01); *F02D 2041/1412* (2013.01); *F02M 26/05* (2016.02)

(58) Field of Classification Search
  CPC ..... F02D 2009/0276; F02D 2041/0017; F02D 2200/0802
  See application file for complete search history.

(56) References Cited

U.S. PATENT DOCUMENTS

| | | | | |
|---|---|---|---|---|
| 2007/0079614 A1* | 4/2007 | Barbe | F02D 41/0072 | 60/605.2 |
| 2007/0239330 A1* | 10/2007 | Baumann | F02M 25/0818 | 701/33.7 |
| 2007/0246028 A1* | 10/2007 | Fujita | F02M 26/05 | 123/568.12 |
| 2008/0022677 A1* | 1/2008 | Barbe | F02D 23/02 | 60/599 |
| 2008/0295514 A1* | 12/2008 | Ono | F02M 26/15 | 60/602 |
| 2010/0000213 A1* | 1/2010 | Onishi | F02M 26/10 | 60/602 |
| 2010/0000500 A1* | 1/2010 | Shimizu | F02D 41/0065 | 123/568.21 |
| 2010/0326408 A1* | 12/2010 | Clarke | F02M 26/05 | 123/568.21 |
| 2011/0023842 A1* | 2/2011 | Kurtz | F02D 41/0065 | 123/568.12 |
| 2011/0023846 A1* | 2/2011 | Miyazaki | F02M 26/05 | 123/568.16 |
| 2011/0088674 A1* | 4/2011 | Shutty | F02M 26/06 | 123/568.21 |
| 2011/0139133 A1* | 6/2011 | Surnilla | F02D 41/0055 | 123/568.12 |
| 2011/0209690 A1* | 9/2011 | Ulrey | F02M 26/06 | 123/564 |
| 2011/0265453 A1* | 11/2011 | Uhrich | F01N 3/0842 | 60/274 |
| 2011/0265454 A1* | 11/2011 | Smith | F01N 3/0842 | 60/274 |
| 2011/0265771 A1* | 11/2011 | Banker | F02D 41/0087 | 123/564 |
| 2011/0308503 A1* | 12/2011 | Yasui | F02D 41/005 | 123/568.21 |
| 2012/0037134 A1* | 2/2012 | Jankovic | F02M 26/06 | 123/568.21 |
| 2012/0240557 A1* | 9/2012 | Kawaguchi | F01N 3/20 | 60/278 |
| 2012/0247101 A1* | 10/2012 | Ulrey | F02D 41/0007 | 60/605.2 |
| 2012/0285161 A1* | 11/2012 | Kerns | F02D 41/0087 | 60/598 |
| 2013/0000615 A1* | 1/2013 | Hodebourg | F02M 26/47 | 123/568.11 |
| 2013/0025575 A1* | 1/2013 | Vitiello | F02D 11/10 | 123/568.2 |
| 2014/0047833 A1* | 2/2014 | Buckland | F02D 41/0007 | 60/599 |
| 2014/0048048 A1* | 2/2014 | Glugla | F02M 35/088 | 123/542 |
| 2014/0048049 A1* | 2/2014 | Glugla | F02D 41/0007 | 123/563 |
| 2014/0048050 A1* | 2/2014 | Pfab | F02M 35/1038 | 123/568.12 |
| 2014/0053547 A1* | 2/2014 | Wade | F02B 33/34 | 60/599 |
| 2014/0075976 A1* | 3/2014 | Glugla | F28F 27/00 | 62/150 |
| 2014/0202436 A1* | 7/2014 | Inagaki | F02M 26/48 | 123/568.21 |
| 2014/0316672 A1* | 10/2014 | Uhrich | G01N 27/223 | 701/102 |
| 2014/0316676 A1* | 10/2014 | Pursifull | F02D 41/222 | 701/103 |
| 2014/0318514 A1* | 10/2014 | Pursifull | F02D 41/005 | 123/568.29 |
| 2015/0051762 A1* | 2/2015 | Banker | B60W 10/08 | 701/22 |
| 2015/0053177 A1* | 2/2015 | Wooldridge | F02D 41/005 | 123/406.3 |
| 2015/0057911 A1* | 2/2015 | Wooldridge | F02D 41/005 | 701/108 |
| 2015/0083094 A1* | 3/2015 | Pursifull | F02B 37/162 | 123/559.1 |
| 2015/0096534 A1* | 4/2015 | Kerns | F02B 37/00 | 123/406.21 |
| 2015/0114348 A1* | 4/2015 | Pursifull | F01M 13/04 | 123/403 |
| 2015/0114350 A1* | 4/2015 | Pursifull | F02M 35/10255 | 123/445 |
| 2015/0135705 A1* | 5/2015 | Pursifull | F02M 26/05 | 60/599 |
| 2015/0192081 A1* | 7/2015 | Ranspach | F02D 41/18 | 60/274 |
| 2015/0204283 A1* | 7/2015 | VanDerWege | F02M 35/10229 | 123/445 |
| 2015/0260114 A1* | 9/2015 | Kanayama | F02D 41/0072 | 60/605.2 |
| 2015/0275771 A1* | 10/2015 | Pochner | F02D 29/02 | 701/103 |
| 2015/0283990 A1* | 10/2015 | Ulrey | B60K 6/445 | 477/3 |
| 2015/0285161 A1* | 10/2015 | Ulrey | B60W 20/16 | 477/3 |
| 2015/0292421 A1* | 10/2015 | Pursifull | F02D 41/004 | 123/518 |
| 2015/0345415 A1* | 12/2015 | Shim | F02D 21/08 | 123/568.21 |
| 2015/0354483 A1* | 12/2015 | Brewbaker | F02M 26/06 | 60/605.2 |
| 2016/0102623 A1* | 4/2016 | Hakeem | F02D 41/0007 | 701/113 |
| 2016/0146130 A1* | 5/2016 | Haskara | F02D 41/0072 | 701/108 |
| 2016/0146136 A1* | 5/2016 | Surnilla | F02D 41/005 | 123/568.21 |
| 2016/0274073 A1* | 9/2016 | Hakeem | G01N 30/7206 | |
| 2017/0306858 A1* | 10/2017 | Ulrey | B60W 20/40 | |
| 2017/0328263 A1* | 11/2017 | Uhrich | F02M 26/06 | |
| 2018/0135565 A1* | 5/2018 | Choi | F02D 41/004 | |
| 2018/0142640 A1* | 5/2018 | Nakamura | F02D 41/005 | |
| 2018/0216563 A1* | 8/2018 | Whitney | F02D 43/04 | |
| 2018/0252167 A1* | 9/2018 | Suzuki | F02D 41/005 | |
| 2018/0258871 A1* | 9/2018 | Hamamoto | F02D 41/0077 | |
| 2018/0274499 A1* | 9/2018 | Ueno | F02D 41/005 | |
| 2018/0298838 A1* | 10/2018 | Pisu | F02D 35/028 | |
| 2018/0363576 A1* | 12/2018 | Nakamura | F02D 41/123 | |
| 2019/0003408 A1* | 1/2019 | Hata | B60W 20/19 | |
| 2019/0048805 A1* | 2/2019 | Pursifull | F02M 35/10222 | |
| 2019/0128196 A1* | 5/2019 | Wang | F02D 41/0077 | |
| 2019/0128197 A1* | 5/2019 | Wang | F02D 41/2451 | |
| 2019/0136802 A1* | 5/2019 | Kopold | F02D 41/0065 | |
| 2019/0186390 A1* | 6/2019 | Kelly | F02B 33/40 | |
| 2019/0234328 A1* | 8/2019 | Yonekura | F02D 41/145 | |
| 2019/0301387 A1* | 10/2019 | Jin | F02D 41/1406 | |
| 2019/0331035 A1* | 10/2019 | Yonekura | F02M 26/02 | |
| 2019/0353109 A1* | 11/2019 | Hamamoto | F02D 41/0007 | |
| 2019/0360417 A1* | 11/2019 | Hesketh | F02D 41/0077 | |
| 2019/0368448 A1* | 12/2019 | Arakawa | F02D 41/0052 | |
| 2020/0003164 A1* | 1/2020 | Choi | G07C 5/0808 | |
| 2020/0123989 A1* | 4/2020 | Arakawa | F02P 5/1516 | |

(56) References Cited

U.S. PATENT DOCUMENTS

| | | | |
|---|---|---|---|
| 2020/0141359 A1* | 5/2020 | Nakagawa | F02M 25/0836 |
| 2020/0157989 A1* | 5/2020 | Patil | F02B 29/0468 |
| 2020/0158032 A1* | 5/2020 | Lawrence | F02D 41/0007 |
| 2020/0158051 A1* | 5/2020 | Tutton | F02B 37/001 |
| 2020/0408161 A1* | 12/2020 | Nakamura | F02B 37/16 |
| 2021/0156318 A1* | 5/2021 | Hamamoto | F02D 41/006 |
| 2021/0172403 A1* | 6/2021 | Klanow | F02D 41/0077 |
| 2021/0317795 A1* | 10/2021 | Nakamura | F02D 41/0045 |

FOREIGN PATENT DOCUMENTS

| | | | | |
|---|---|---|---|---|
| JP | 10274108 A | * | 10/1998 | |
| JP | 2012215142 A | * | 11/2012 | |
| WO | WO-2020021876 A1 | * | 1/2020 | F02D 43/00 |

\* cited by examiner

SECONDARY THROTTLE CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines, and more specifically, to systems and methods for controlling a throttle valve upstream of a turbocharger compressor.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

In a feature, an engine system includes: a first throttle valve; a turbocharger compressor disposed downstream of the first throttle valve; a charge air cooler disposed downstream of the turbocharger compressor; a second throttle valve located downstream of the turbocharger compressor; a purge inlet located downstream of the first throttle valve and configured to introduce fuel vapor from a fuel tank into intake air; and an engine control module configured to: maintain the first throttle valve in a fully open position; and selectively close the first throttle valve relative to the fully open position in response to receipt of a request to purge fuel vapor from the fuel tank.

In further features, the engine system does not include a purge pump configured to pump the fuel vapor from the fuel tank to the purge inlet.

In further features, the charge air cooler is an air to air charge air cooler.

In further features, the engine control module is further configured to selectively close the first throttle valve relative to the fully open position in response to receipt of a request to decrease air induction noise.

In further features, the engine control module is further configured to selectively close the first throttle valve relative to the fully open position in response to receipt of a request to perform a catalyst light off event.

In further features, the engine control module is further configured to selectively close the first throttle valve relative to the fully open position in response to an increase in an engine torque request.

In further features, the engine control module is further configured to selectively close the first throttle valve relative to the fully open position based on exhaust gas recirculation.

In further features, the engine control module is further configured to selectively close the first throttle valve relative to the fully open position during a deceleration fuel cutoff (DFCO) event.

In further features, the engine control module is configured to control the second throttle valve using model predictive control (MPC).

In further features, an MPC module is configured to perform the model predictive control and control engine actuators including the first and second throttle valves based on at least one of (a) minimizing a difference between a torque request and torque output of the engine, (b) minimizing fuel consumption of the engine, (c) minimizing exhaust emissions, and (d) minimizing noise and vibration of the engine.

In a feature, an engine system includes: a first throttle valve; a turbocharger compressor disposed downstream of the first throttle valve; a charge air cooler disposed downstream of the turbocharger compressor; a second throttle valve located downstream of the turbocharger compressor; a purge inlet located downstream of the first throttle valve and configured to introduce fuel vapor from a fuel tank into intake air; and an engine control module configured to: maintain the first throttle valve in a fully open position; and selectively close the first throttle valve relative to the fully open position in response to receipt of a request to at least one of decrease and prevent icing of the charge air cooler.

In further features, the charge air cooler is an air to air charge air cooler.

In further features, the charge air cooler is a charge to air charge air cooler.

In further features, the engine control module is further configured to selectively close the first throttle valve relative to the fully open position in response to receipt of a request to decrease air induction noise.

In further features, the engine control module is further configured to selectively close the first throttle valve relative to the fully open position in response to receipt of a request to perform a catalyst light off event.

In further features, the engine control module is further configured to selectively close the first throttle valve relative to the fully open position in response to an increase in an engine torque request.

In further features, the engine control module is further configured to selectively close the first throttle valve relative to the fully open position based on exhaust gas recirculation.

In further features, the engine control module is further configured to selectively close the first throttle valve relative to the fully open position during a deceleration fuel cutoff (DFCO) event.

In further features, the engine control module is configured to control the second throttle valve using model predictive control (MPC).

In further features, an MPC module is configured to perform the model predictive control and control engine actuators including the first and second throttle valves based on at least one of (a) minimizing a difference between a torque request and torque output of the engine, (b) minimizing fuel consumption of the engine, (c) minimizing exhaust emissions, and (d) minimizing noise and vibration of the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some types of boosted engines include a turbocharger that increases airflow into the engine. Boosted engines may include an electric purge pump that pumps fuel vapor from a fuel tank to the intake system. A charge air cooler may cool the air output from the turbocharger compressor before the air flows into the engine for combustion. A first throttle valve is disposed downstream of the turbocharger compressor. An engine control module controls opening of the first throttle valve, for example, based on an engine torque request.

According to the present disclosure, a second throttle valve is disposed upstream of the turbocharger compressor. The engine control module may generally maintain the second throttle valve fully open to minimize losses. The engine control module, however, at least partially closes the second throttle valve under one or more operating conditions.

For example, the engine control module may at least partially close the second throttle valve to create vacuum to draw fuel vapor from the fuel tank to the intake system. As such, an electric purge pump need not be implemented.

As another example, the engine control module may at least partially close the second throttle valve to prevent, minimize, or decrease icing of the charge air cooler. Closing the second throttle valve may ensure that warmer air is provided to the charge air cooler to prevent, minimize, or decrease icing of the charge air cooler.

As another example, the engine control module may at least partially close the second throttle valve to create vacuum to draw exhaust gas from downstream of the turbocharger turbine through an exhaust gas recirculation valve. The pressure at this exhaust gas recirculation valve may be insufficient to flow exhaust gas back to the intake system without vacuum. The engine control module may at least partially close the second throttle valve under one or more other conditions, such as during a catalyst lightoff event, to increase a response of the turbocharger, during a deceleration fuel cutoff (DFCO) event, and/or to minimize or decrease induction noise.

Figure 1:
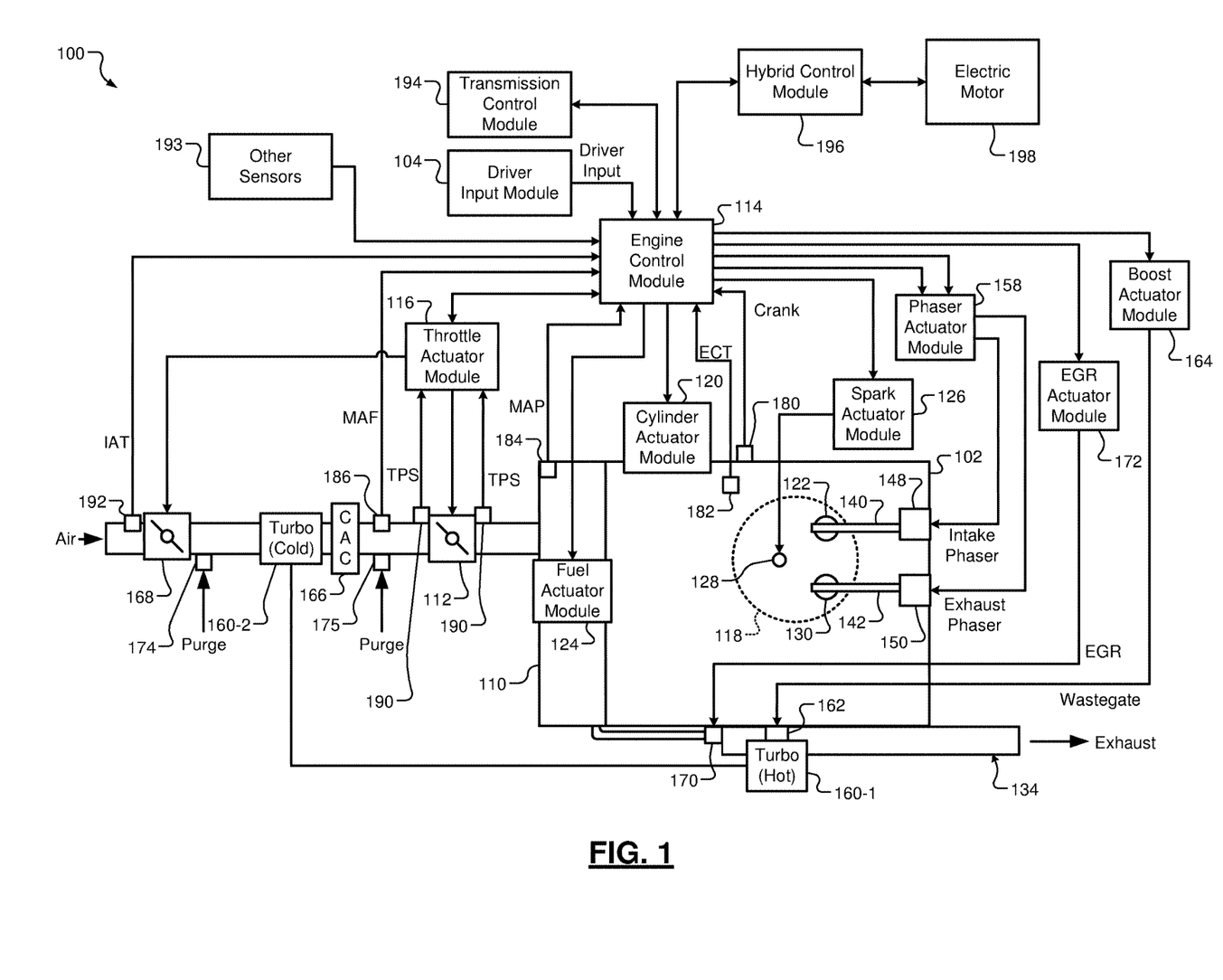
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a first throttle valve 112. For example only, the first throttle valve 112 may include a butterfly valve having a rotatable blade. An engine control module (ECM) 114 controls a throttle actuator module 116, which regulates opening of the first throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 includes a turbocharger that includes a hot turbine 160-1 that is powered (rotatably driven) by hot exhaust gases flowing through the exhaust system 134. The turbocharger also includes a cold air compressor 160-2 that is driven by the turbine 160-1. The compressor 160-2 compresses air leading into the first throttle valve 112.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

A charge air cooler (CAC) 166 may transfer heat from the compressed air charge to a cooling medium, such as engine coolant or air. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

A second throttle valve 168 is disposed upstream of the compressor 160-2. Generally, the second throttle valve 168 may be maintained in a fully open (e.g., wide open throttle (WOT)) position. The second throttle valve 168 may be partially or completely closed under one or more conditions, such as for fuel vapor purging, de-icing of the CAC 166, catalyst light off, exhaust gas recirculation (EGR) control (e.g., to draw exhaust gas from downstream of the turbine 160-1 to the intake system), decreasing turbocharger response, etc.

The engine system 100 may include one or more EGR valves, such as an EGR valve 170, which selectively redirect exhaust gas back to the intake manifold 110. The EGR valve 170 may be located upstream of the turbocharger's turbine 160-1. An additional (low pressure) EGR valve may be located downstream of the turbine 160-1. The EGR valve(s) may be controlled by an EGR actuator module 172 based on signals from the ECM 114.

A fuel vapor purge inlet 174 may be disposed upstream of the second throttle valve 168 or between the second throttle valve 168 and the turbocharger compressor 160-2. Fuel is stored in a fuel tank. Fuel vapor is purged from the fuel tank through the fuel vapor purge inlet 174 to the intake system via opening of a purge valve and a vent valve. The vehicle does not include a pump that pumps the fuel vapor to the intake system. Instead, the fuel vapor is drawn to the intake system via vacuum, such as vacuum created by closing of the second throttle valve 168. A second fuel vapor purge inlet 175 may be provided, such as between the CAC 166 and the first throttle valve 112.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the first throttle valve 112.

The throttle actuator module 116 may monitor the position of the first and second throttle valves 112 and 168 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the first and second throttle valves 112 and 168 to achieve target throttle opening areas. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve(s) to achieve one or more target EGR opening areas. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 may generate the target values for the engine actuators using model predictive control (MPC) or another suitable type of control, as discussed further below.

Figure 2:
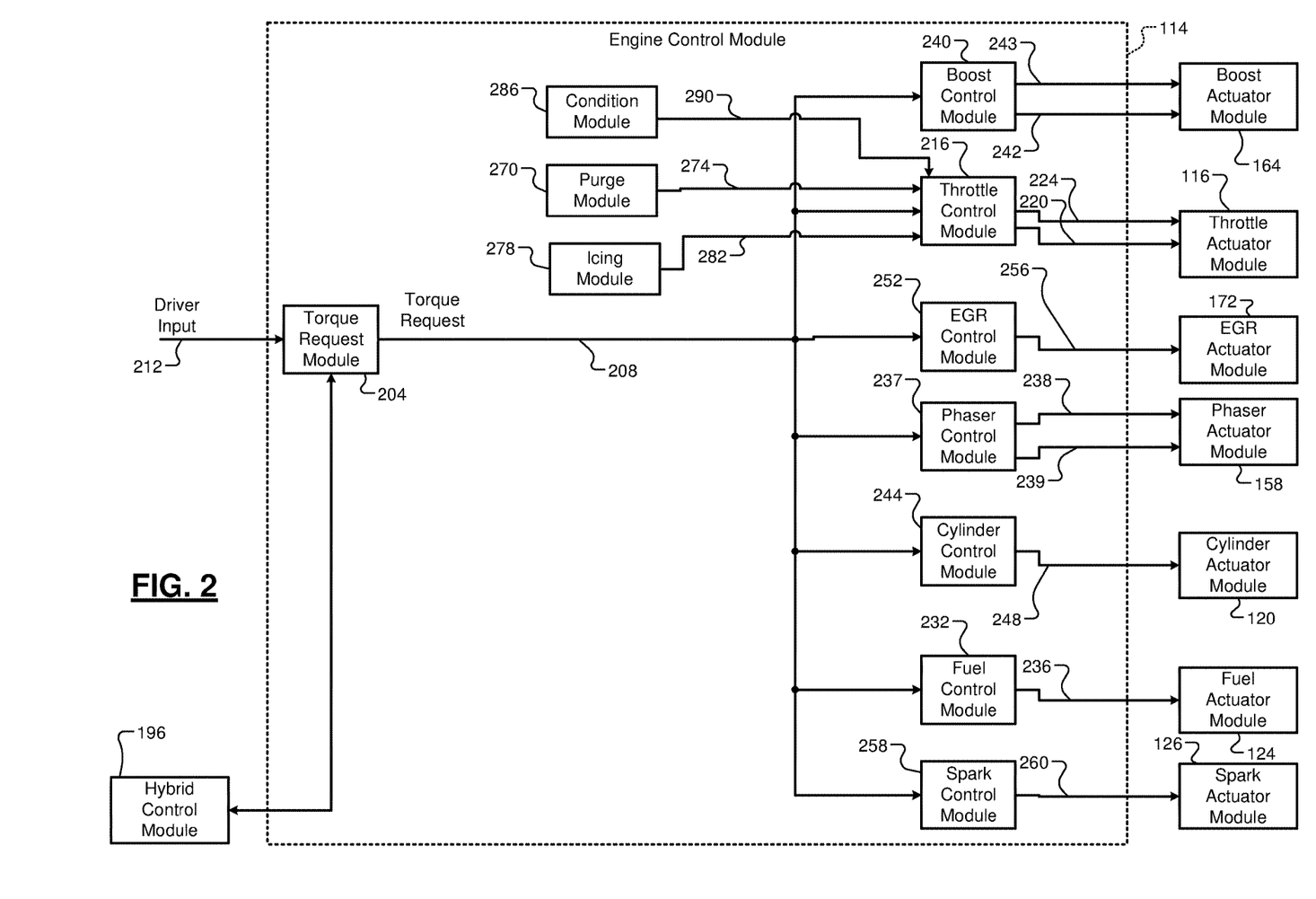
FIGS. 2-3 are functional block diagrams of example engine control systems.

Referring now to FIG. 2, a functional block diagram of an example engine control system is presented. A torque request module 204 determines a torque request 208 for the engine 102 based on one or more inputs 212. The inputs 212 may include, for example, an accelerator pedal position, a brake pedal position, a cruise control input, and/or one or more other suitable inputs. For example, the torque request module 204 may increase the torque request 208 as the APP increases (relative to a predetermined resting APP) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc. The torque request module 204 may determine the torque request 208 (e.g., in Nm) using one or more equations and/or lookup tables that relate input(s) to torque requests.

The torque request module 204 may also determine the amount of torque to be produced by the engine 102 and the amount of torque to be produced via one or more electric motors. The torque request module 204 may transmit a motor torque request to the hybrid control module 196 corresponding to the amount of torque to be produced via the one or more electric motors. The hybrid control module 196 controls an inverter that controls electric power flow to and from the electric motor(s) to achieve the motor torque request. The torque request 208 includes the amount of torque to be produced by the engine 102.

The ECM 114 controls one or more engine actuators based on the torque request 208 and/or one or more other parameters. For example, a throttle control module 216 may determine a first target throttle opening 220 and a second target throttle opening 224 based on the torque request 208. The throttle actuator module 116 may adjust opening of the first and second throttle valves 112 and 168 based on the first and second target throttle openings 220 and 224, respectively. While the example of the throttle actuator module 116 actuating both the first and second throttle valves 112 and 168 is provided, one throttle actuator module may actuate the first throttle valve 112 and another throttle actuator module may actuate the second throttle valve 168.

A fuel control module 232 determines one or more target fueling parameters 236 based on the torque request 208. For example, the target fueling parameters 236 may include a target equivalence ratio (EQR) or mass of fuel, number of fuel injections per combustion event, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A boost control module 240 sets a target wastegate opening 242 based on the torque request 208. The boost actuator module 164 controls opening of the wastegate 162 based on the target wastegate opening 242. For example only, the boost actuator module 164 may determine a target duty cycle (DC) to apply to the wastegate 162 based on the target wastegate opening 242 using an equation or a lookup table that relates target wastegate openings to target DCs. The boost actuator module 164 may apply a signal to the wastegate 162 based on the target DC.

The boost control module 240 may also set a target turbo configuration 243 based on the torque request 208. The target turbo configuration 243 may include, for example, a position of vanes of the turbocharger, a geometry of the turbocharger, or another suitable parameter. The boost actuator module 164 may control the turbocharger turbine and/or the turbocharger compressor based on the target turbo configuration 243.

A cylinder control module 244 generates cylinder activation/deactivation commands 248 based on the torque request 208. The cylinder actuator module 120 deactivates the intake and exhaust valves of the cylinders based on the activation/deactivation commands 248.

The fuel control module 232 halts fueling of deactivated cylinders. The fuel control module 232 sets the target fueling parameters 236 to provide fuel to activated cylinders. Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed. The fuel control module 232 may cutoff fuel to one, more than one, or all of the cylinders of the engine, for example, during vehicle deceleration. This may decrease fuel consumption of the engine 102.

An EGR control module 252 determines a target EGR opening 256 based on the torque request 208. The EGR actuator module 172 controls opening of the EGR valve 170 based on the target EGR opening. The EGR control module 252 may also determine another target EGR opening (e.g., for a low pressure EGR valve). The EGR actuator module 172 (or another EGR actuator module) may control opening of another EGR valve based on the other target EGR opening.

A spark control module 258 determines a target spark timing 260 based on the torque request 208. The spark actuator module 126 controls spark timing based on the target spark timing 260.

The throttle control module 216 generally sets the second target throttle opening 224 for the second throttle valve 168 to a predetermined fully open position. The fully open position may also be referred to as a wide open throttle (WOT) position. The second throttle valve 168 is open as much as possible when in the fully open position.

The throttle control module 216 generates the second target throttle opening 224 to partially or completely close the second throttle valve 168 under one or more conditions and/or when one or more events occur. The throttle control module 216 may generate the second throttle opening 224 to close the second throttle valve 168 by a predetermined amount (e.g., by decreasing or the second target throttle opening 224) or set the second target throttle opening 224 to a predetermined opening.

As an example of a condition or event, a purge module 270 may generate a request 274 to perform fuel vapor purging when one or more predetermined conditions occur. The purge module 270 may generate the request 274, for example, in response to a startup of the engine, when an amount of fuel vapor within the fuel tank is greater than a predetermined amount, or when one or more other predetermined conditions are satisfied. The purge module 270 may open the purge valve and the vent valve when the request 274 is generated. The throttle control module 216 generates the second target throttle opening 224 to partially or completely close the second throttle valve 168 when the request 274 is generated.

As another example, an icing module 278 may generate a request 282 to prevent or decrease icing of the CAC 166. The icing module 278 may generate the request 282, for example, when a temperature of air output from the CAC 166 is less than a predetermined temperature or when one or more other predetermined conditions are satisfied. The throttle control module 216 generates the second target throttle opening 224 to partially or completely close the second throttle valve 168 when the request 282 is generated. Additionally, the boost control module 240 may increase the opening of the wastegate 170 when the request 282 is generated. Closing the second throttle valve 168 and opening the wastegate 170 may increase work of the turbocharger and increase a temperature of air input to the CAC 166.

As other examples, a condition module 286 may generate a request 290 when one or more other predetermined conditions occur. For example, the condition module 286 may generate the request 290 to perform a catalyst lightoff event. Catalyst lightoff events may be performed, for example, at startup of the vehicle. The condition module 286 may also generate the request 290 when one or more predetermined conditions are present to decrease induction noise. Induction noise may refer to sound that is audible due to air induction into the engine 102. An example of a predetermined condition to decrease induction noise includes during a deceleration fuel cutoff (DFCO) event. The condition module 286 may also generate the request 290 for low pressure EGR control, such as to allow EGR flow from downstream of the turbine 160-1 to the intake system (e.g., between the second throttle valve 168 and the turbocharger compressor 160-2). The condition module 286 may also generate the request 290 to increase a response (and decrease a response period) of the turbocharger, such as when the torque request 208 increases.

While the example of individual control modules determining the respective targets is provided, another suitable type of control system may be used. For example, model predictive control (MPC) may be used to determine the target values collectively.

Figure 3:
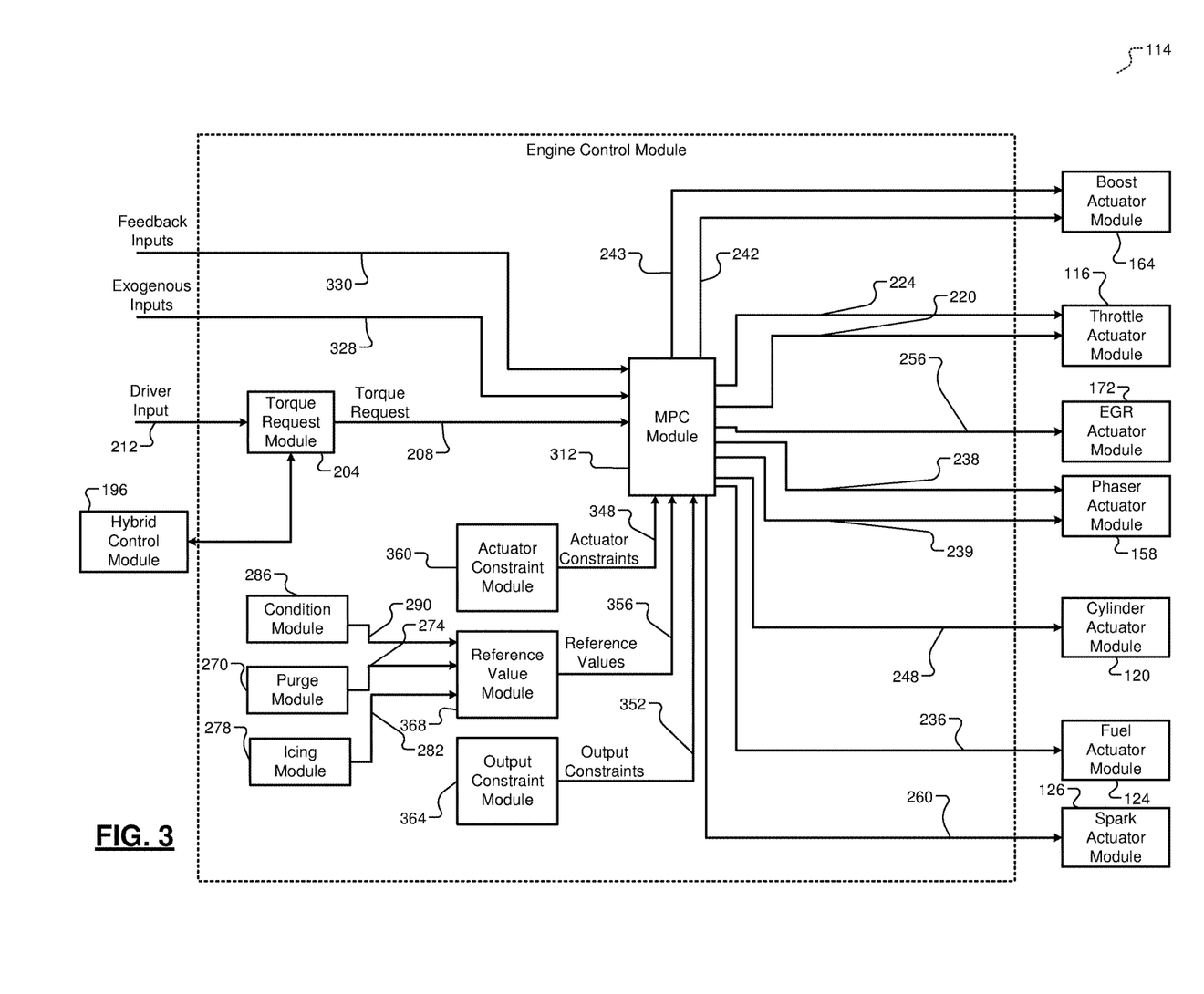

FIG. 3 is a functional block diagram of an example engine control system utilizing MPC. In the example of FIG. 3, an MPC module 312 generates the target values 220, 224, 236, 238, 239, 242, 243, 248, 256, and 260 (collectively "the target values") using MPC (Model Predictive Control). The MPC module 312 may be a single module or include multiple modules.

Generally speaking, the MPC module 312 determines possible sequences of the target values that could be used together during N future control loops. Each of the possible sequences identified includes one sequence of N values for each of the target values. In other words, each possible sequence includes a sequence of N values for the first target throttle opening 220, a sequence of N values for the second target throttle opening 224, a sequence of N values for the target spark timing 260, etc. Each of the N values are for a corresponding one of the N future control loops. N is an integer greater than or equal to one.

The MPC module 312 determines predicted responses of the engine 102 to the possible sequences of the target values, respectively, based on a mathematical model of the engine 102, exogenous inputs 328, and feedback inputs 330. Examples of predicted responses include predicted torques of the engine 102 for the N control loops, predicted amounts of air per cylinder (APC) for the N control loops, predicted dilution for the N control loops, predicted combustion phasing values for the N control loops, predicted combustion quality values for the N control loops, and other responses of the engine 102. While an example of generating predicted torque, predicted APC, predicted external dilution, predicted residual dilution, predicted combustion phasing, and predicted combustion quality is described, the predicted parameters may include one or more other predicted engine operating parameters.

The model may include, for example, a function or a mapping calibrated based on characteristics of the engine 102. Dilution may refer to an amount of exhaust from a prior combustion event trapped within a cylinder for a combustion event, an amount of exhaust provided for a combustion event via the EGR valve 170, and/or an amount of exhaust that remains in a cylinder and/or exhaust that is pushed back into the cylinder following the exhaust stroke of a combustion cycle. Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5—approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by one or more of the engine actuators. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated dilution, and/or one or more other suitable parameters. The feedback inputs 330 may be measured using sensors (e.g., the IAT) and/or estimated based on one or more other parameters.

The MPC module 312 determines a cost value for each of the possible sequences of the target values based on the predicted parameters determined for a possible sequence and reference values 356. An example cost determination is discussed further below. Generally speaking, the cost may increase as predicted parameter moves away from its reference value, and vice versa.

The MPC module 312 selects one of the possible sequences of the target values based on the costs of the possible sequences, respectively. For example, the MPC module 312 may select the one of the possible sequences having the lowest cost while satisfying actuator constraints 348 and output constraints 352.

In various implementations, satisfaction of the actuator constraints 348 and the output constraints 352 may be considered in the cost determination. In other words, the MPC module 312 may determine the cost values further based on the actuator constraints 348 and the output constraints 352. For example, the cost value may increase if a target value of a possible sequence falls outside of at least one of its actuator constraint and output constraint. Generally, based on how the cost values are determined, the MPC module 312 may select the one of the possible sequences that best achieves the torque request 208 (minimizing a difference between the torque request 208 and torque output of the engine) and one or more other objectives, subject to the actuator constraints 348 and the output constraints 352. Examples of other objectives include minimizing fuel consumption of the engine, minimizing exhaust emissions, and minimizing noise and vibration of the engine.

The MPC module 312 may set the target values to the first ones of the N values of the selected possible sequence, respectively. In other words, the MPC module 312 may set the second target throttle opening 224 to the first one of the N values in the sequence of N values for the second target throttle opening 224, set the first target throttle opening 220 to the first one of the N values in the sequence of N values for the first target throttle opening 220, etc.

During a next control loop, the MPC module 312 identifies possible sequences, generates the predicted parameters for the possible sequences, determines the cost of each of the possible sequences, selects of one of the possible sequences, and sets of the target values to the first set of the target values in the selected possible sequence. This process continues for each control loop.

An actuator constraint module 360 sets the actuator constraints 348 for each of the target values. In other words, the actuator constraint module 360 sets actuator constraints for the first throttle valve 112, the actuator constraints for the second throttle valve 168 actuator constraints for the EGR valve 170, actuator constraints for the wastegate 162, actuator constraints for the intake cam phaser 148, actuator constraints for the exhaust cam phaser 150, actuator constraints for fueling, actuator constraints for cylinder deactivation, and actuator constraints for spark timing.

The actuator constraints 348 for each one of the target values may include a maximum value for an associated target value and a minimum value for that target value. In addition, the actuator constraints 348 may include a rate of change constraint for an associated target value. The actuator constraint module 360 may generally set the actuator constraints 348 to predetermined operational ranges for the associated actuators. More specifically, the actuator constraint module 360 may generally set the actuator constraints 348 to predetermined operational ranges for the first throttle valve 112, the EGR valve 170, the wastegate 162, the intake cam phaser 148, the exhaust cam phaser 150, etc.

However, the actuator constraint module 360 may selectively adjust one or more of the actuator constraints 348 under some circumstances. For example, the actuator constraint module 360 may adjust the actuator constraints for a given actuator to narrow the operational range for that engine actuator when a fault is diagnosed in that engine actuator. For another example only, the actuator constraint module 360 may adjust the actuator constraints such that the target value for a given actuator follows a predetermined schedule over time or changes by a predetermined amount, for example, for a fault diagnostic, such as a cam phaser fault diagnostic, a throttle diagnostic, an EGR diagnostic, etc. For a target value to follow a predetermined schedule over time or to change by a predetermined amount, the actuator constraint module 360 may set the minimum and maximum values to the same value. The minimum and maximum values being set to the same value may force the corresponding target value to be set to the same value as the minimum and maximum values. The actuator constraint module 360 may vary the same value to which the minimum and maximum values are set over time to cause the target value to follow a predetermined schedule.

An output constraint module 364 sets the output constraints 352 for the predicted responses (values). The output constraints 352 for each one of the predicted values may include a maximum value for an associated predicted parameter and a minimum value for that predicted parameter. For example, the output constraints 352 may include a minimum torque, a maximum torque, a minimum CA50 and a maximum CA50, a minimum COV of IMEP and a maximum COV of IMEP, a minimum dilution and a maximum dilution, etc.

The output constraint module 364 may generally set the output constraints 352 to predetermined ranges for the associated predicted parameters, respectively. However, the output constraint module 364 may vary one or more of the output constraints 352 under some circumstances. For example, the output constraint module 364 may retard the maximum CA50, such as when knock occurs within the engine 102. For another example, the output constraint module 364 may increase the maximum COV of IMEP under low load conditions, such as during engine idling where a higher COV of IMEP may be needed to achieve a given torque request.

A reference value module 368 generates the reference values 356 for the target values, respectively. The reference values 356 include a reference value for each of the target values. In other words, the reference values 356 include a reference wastegate opening area, reference first and second throttle openings, a reference EGR opening area, a reference intake cam phaser angle, a reference exhaust cam phaser angle, reference fueling parameters, a reference spark timing, etc.

The reference value module 368 may determine the reference values 356, for example, based on the torque request 208. The reference values 356 provide references for setting the target values, respectively. The reference values 356 may be used to determine the cost values for possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values using a quadratic programming (QP) solver, such as a Dantzig QP solver. In another example, the MPC module 312 may generate a surface of cost values for the possible sequences of the target values and, based on the slope of the cost surface, identify a sequence of possible target values having the lowest cost. The MPC module 312 may then test that sequence of possible target values to determine whether that sequence of possible target values satisfies the actuator constraints 348 and the output constraints 352. If so, the MPC module 312 may set the target values to the first ones of the N values of that selected possible sequence, respectively, as discussed above.

If the actuator constraints 348 and/or the output constraints 352 are not satisfied, the MPC module 312 selects another sequence of possible target values with a next lowest cost and tests that sequence of possible target values for satisfaction of the actuator constraints 348 and the output constraints 352. The process of selecting a sequence and testing the sequence for satisfaction of the actuator constraints 348 and the output constraints 352 may be referred to as an iteration. Multiple iterations may be performed during each control loop.

The MPC module 312 performs iterations until a sequence with the lowest cost that satisfies the actuator constraints 348 and the output constraints 352 is identified. In this manner, the MPC module 312 selects the sequence of possible target values having the lowest cost while satisfying the actuator constraints 348 and the output constraints 352. If a sequence cannot be identified, the MPC module 312 may indicate that no solution is available.

The MPC module 312 may determine the cost for the possible sequences of the target values using one or more equations and/or lookup tables that relate the inputs to the costs. The MPC module 312 may determine the costs based on relationships between parameters (e.g., target values and constraints, target values and references, predicted parameters and constraints, etc.). The relationships may be weighted, for example, to control the effect that each of the relationships has on the cost.

In the example of MPC control, the requests 274, 282, and 290 may be input to the reference value module 368. The reference value module 368 may set the second target throttle opening 224 for the second throttle valve 168 to close the second throttle valve 168 when at least one of the requests 274, 282, and 290 is generated.

Figure 4:
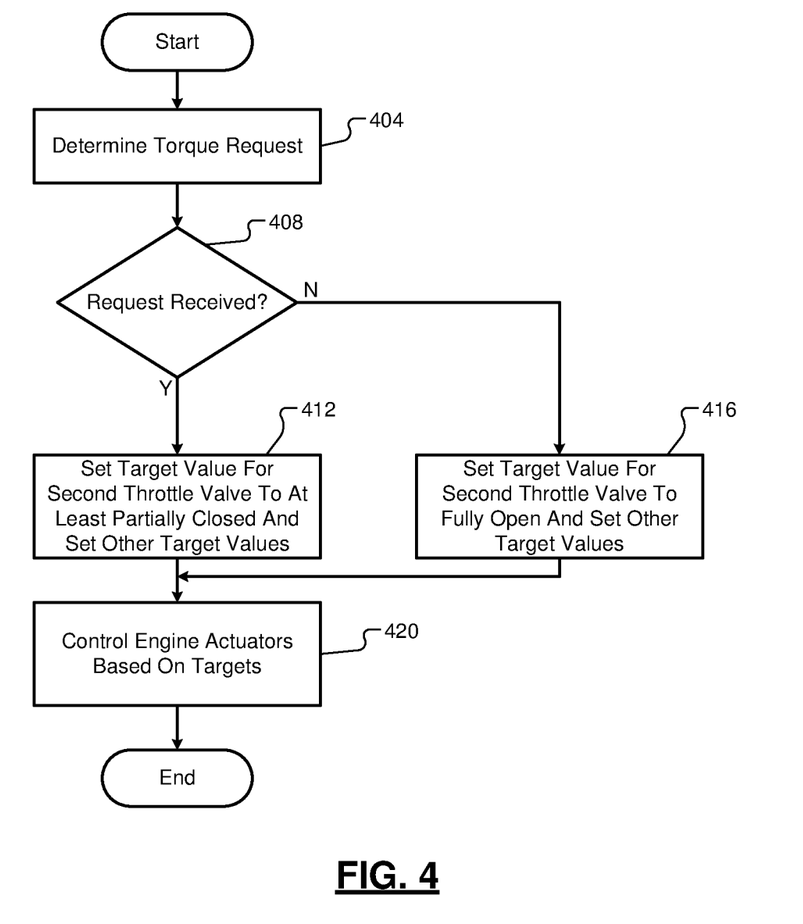
FIG. 4 is a flowchart depicting an example method of controlling engine actuators.

FIG. 4 is a flowchart depicting an example method of controlling engine actuators. Control begins with 404 where the torque request module 204 determines the torque request 208. At 408, a determination of whether one or more of the requests 274, 282, and 292 has been received. If so, control continues with 412. I false control continues with 416.

At 412, the second target throttle opening 224 is set to at least partially close the second throttle valve 168 and other ones of the target values are set based on the torque request 208. The other target values may be set by the control modules as in the example of FIG. 2 or by the MPC module 312 in the example of FIG. 3. At 416, the second target throttle opening 224 is set to open the second throttle valve 168 to the fully open position and other ones of the target values are set based on the torque request 208. The other target values may be set by the control modules as in the example of FIG. 2 or by the MPC module 312 in the example of FIG. 3.

At 420, the actuator modules control the respective engine actuators based on the respective target values. While control is shown as ending after 420, the example of FIG. 4 may be illustrative of one control loop. Control loops may be started every predetermined period.

By controlling the second throttle valve as described above, a purge pump need not be included to pump fuel vapor to the intake system. Instead, vacuum within the intake system can be used to draw the fuel vapor to the intake system. Additionally, the CAC 166 may be an air to air CAC and an air to coolant CAC may not need to be included. Air to air CACs are less expensive than air to coolant CACs. Closing the second throttle valve 168 increases compressor pressure ratio (pressure across the compressor, which increases compressor outlet temperature and prevents or minimizes icing).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine system, comprising:
   a first throttle valve;
   a turbocharger compressor disposed downstream of the first throttle valve;
   a charge air cooler disposed downstream of the turbocharger compressor;
   a second throttle valve located downstream of the turbocharger compressor;
   a purge inlet located downstream of the first throttle valve and configured to introduce fuel vapor from a fuel tank into intake air; and
   an engine control module that includes a model predictive control (MPC) module configured to, using model predictive control, control the first throttle valve, the second throttle valve, and the turbocharger compressor, the control including:
      maintaining the first throttle valve in a fully open position; and
      selectively closing the first throttle valve from the fully open position in response to receipt of a request to purge the fuel vapor from the fuel tank.

2. The engine system of claim 1 wherein the engine system does not include a purge pump configured to pump the fuel vapor from the fuel tank to the purge inlet.

3. The engine system of claim 1 wherein the charge air cooler is an air-to-air charge air cooler.

4. The engine system of claim 1 wherein the MPC module is further configured to selectively close the first throttle valve relative to the fully open position in response to receipt of a request to decrease air induction noise.

5. The engine system of claim 1 wherein the MPC module is further configured to selectively close the first throttle valve relative to the fully open position in response to receipt of a request to perform a catalyst light off event.

6. The engine system of claim 1 wherein the MPC module is further configured to selectively close the first throttle valve relative to the fully open position in response to an increase in an engine torque request.

7. The engine system of claim 1 wherein the MPC module is further configured to selectively close the first throttle valve relative to the fully open position based on exhaust gas recirculation.

8. The engine system of claim 1 wherein the MPC module is further configured to selectively close the first throttle valve relative to the fully open position during a deceleration fuel cutoff (DFCO) event.

9. The engine system of claim 1 wherein the MPC module is configured to, using model predictive control, further control at least one of (a) an exhaust gas recirculation (EGR) valve, (b) an intake camshaft phaser, and (c) an exhaust camshaft phaser.

10. The engine system of claim 9 wherein the MPC module is configured to perform the model predictive control and control actuators of an engine including the first and second throttle valves and the turbocharger compressor based on at least one of (a) minimizing a difference between a torque request and torque output of the engine, (b) minimizing fuel consumption of the engine, (c) minimizing exhaust emissions, and (d) minimizing noise and vibration of the engine.

11. An engine system, comprising:
a first throttle valve;
a turbocharger compressor disposed downstream of the first throttle valve;
a charge air cooler disposed downstream of the turbocharger compressor;
a second throttle valve located downstream of the turbocharger compressor; and
an engine control module that includes a model predictive control (MPC) module configured to, using model predictive control, control the first throttle valve, the second throttle valve, and the turbocharger compressor, the control including:
maintaining the first throttle valve in a fully open position; and
selectively closing the first throttle valve from the fully open position in response to receipt of a request to decrease icing of the charge air cooler.

12. The engine system of claim 11 wherein the charge air cooler is an air-to-air charge air cooler.

13. The engine system of claim 11 wherein the charge air cooler is a coolant-to-air charge air cooler.

14. The engine system of claim 11 wherein the MPC module is further configured to selectively close the first throttle valve relative to the fully open position in response to receipt of a request to decrease air induction noise.

15. The engine system of claim 11 wherein the MPC module is further configured to selectively close the first throttle valve relative to the fully open position in response to receipt of a request to perform a catalyst light off event.

16. The engine system of claim 11 wherein the MPC module is further configured to selectively close the first throttle valve relative to the fully open position in response to an increase in an engine torque request.

17. The engine system of claim 11 wherein the MPC module is further configured to selectively close the first throttle valve relative to the fully open position based on exhaust gas recirculation.

18. The engine system of claim 11 wherein the MP module is further configured to selectively close the first throttle valve relative to the fully open position during a deceleration fuel cutoff (DFCO) event.

19. The engine system of claim 11 wherein the MPC module is configured to further control, using model predictive control, at least one of (a) an exhaust gas recirculation (EGR) valve, (b) an intake camshaft phaser, and (c) an exhaust camshaft phaser.

20. The engine system of claim 19 wherein the MPC module is configured to perform the model predictive control and control actuators of an engine including the first and second throttle valves and the turbocharger compressor based on at least one of (a) minimizing a difference between a torque request and torque output of the engine, (b) minimizing fuel consumption of the engine, (c) minimizing exhaust emissions, and (d) minimizing noise and vibration of the engine.

* * * * *